(12) United States Patent
Watanabe et al.

(10) Patent No.: US 8,442,036 B2
(45) Date of Patent: May 14, 2013

(54) IMAGE COMMUNICATION APPARATUS

(75) Inventors: Satoshi Watanabe, Saitama (JP);
Kazutaka Saitoh, Kanagawa (JP); Yuji Fujikawa, Saitama (JP); Isao Tanaka, Saitama (JP); Hirotaka Kawabata, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 743 days.

(21) Appl. No.: 12/608,471

(22) Filed: Oct. 29, 2009

(65) Prior Publication Data
US 2010/0278172 A1 Nov. 4, 2010

(30) Foreign Application Priority Data
Apr. 30, 2009 (JP) ................................. 2009-111279

(51) Int. Cl.
*H04L 12/66* (2006.01)
(52) U.S. Cl.
USPC ............................ 370/352; 358/468; 709/227
(58) Field of Classification Search ........................ None
See application file for complete search history.

(56) References Cited

U.S. PATENT DOCUMENTS

| | | | | |
|---|---|---|---|---|
| 2008/0174826 A1* | 7/2008 | Fujino | ........................ | 358/3.03 |
| 2008/0200115 A1* | 8/2008 | Tanimoto | .................... | 455/3.06 |
| 2008/0285554 A1* | 11/2008 | Noguchi | ...................... | 370/389 |
| 2009/0168985 A1* | 7/2009 | Yu et al. | .................... | 379/202.01 |
| 2010/0217876 A1* | 8/2010 | Fikouras et al. | ............. | 709/228 |

FOREIGN PATENT DOCUMENTS

| JP | A-2004-32039 | 1/2004 |
|---|---|---|
| JP | A-2006-157120 | 6/2006 |

* cited by examiner

*Primary Examiner* — Chi Pham
*Assistant Examiner* — Mohammad Adhami
(74) *Attorney, Agent, or Firm* — Oliff & Berridge, PLC

(57) ABSTRACT

An image communication apparatus comprises: a call connection control unit that establishes a session with a communication partner using an SIP message; and an image communication control unit that controls an image communication, wherein (i) when the call connection control unit receives, as a calling party, from a called party, an INVITE SIP message in which a T.38 communication and a first priority transport are specified in a session description protocol, and when a second priority transport is set in the image communication apparatus of the calling party, the call connection control unit opens the second priority transport, and (ii) when no priority transport is set in the image communication apparatus of the calling party, the call connection control unit opens the first priority transport specified by the called party, and performs a T.38 communication using the opened transport.

3 Claims, 4 Drawing Sheets

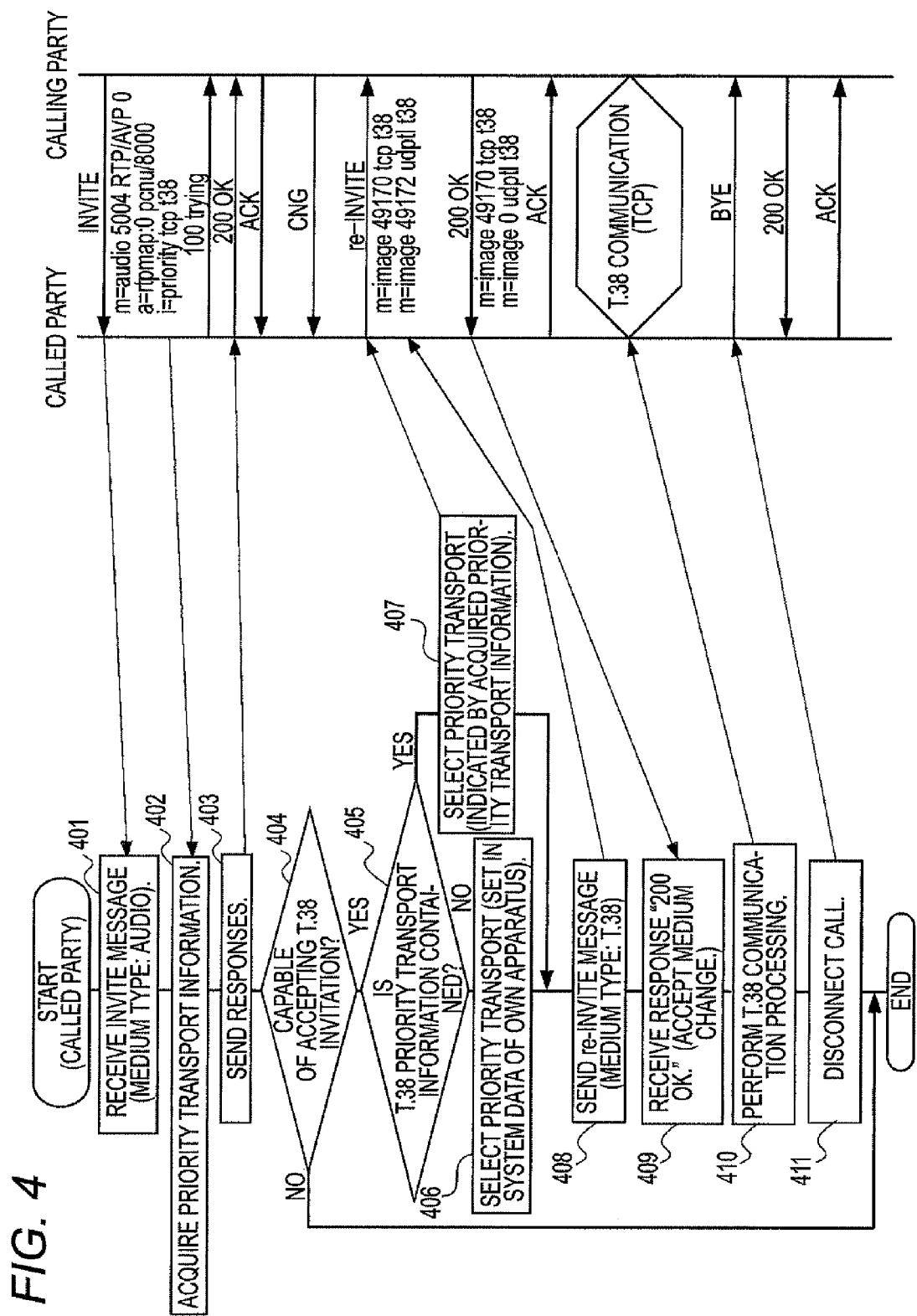

IMAGE COMMUNICATION APPARATUS

CROSS-REFERENCE TO RELATED APPLICATION

This application is based on and claims priority under 35 USC 119 from Japanese Patent Application No. 2009-111279 filed on Apr. 30, 2009.

BACKGROUND

1. Technical Field

The present invention relates to an image communication apparatus.

2. Summary

According to an aspect of the invention, an image communication apparatus comprises: a call connection control unit that establishes a session with a communication partner using an SIP message; and an image communication control unit that controls an image communication which complies with the ITU-T recommendation T.38, wherein (i) when the call connection control unit receives, as a calling party, from a called party, an INVITE SIP message in which a T.38 communication and a first priority transport are specified in a session description protocol after the call connection control unit establishes the session with the communication partner, and when a second priority transport is set in the image communication apparatus of the calling party, the call connection control unit opens the second priority transport, and (ii) when no priority transport is set in the image communication apparatus of the calling party, the call connection control unit opens the first priority transport specified by the called party, and performs a T.38 communication using the opened transport.

BRIEF DESCRIPTION OF THE DRAWINGS

Embodiments of the invention will be described in detail based on the following figures, wherein:

FIG. 4 is a flowchart and a sequence diagram of a process and a communication procedure which are executed and followed by the called party, respectively, in a case that a T.38 priority transport is specified by the calling party in establishing a session on the basis of an audio INVITE SIP message.

DETAILED DESCRIPTION

An embodiment of the present invention will be hereinafter described in detail with reference to the accompanying drawings.

[Embodiment]

Figure 1:
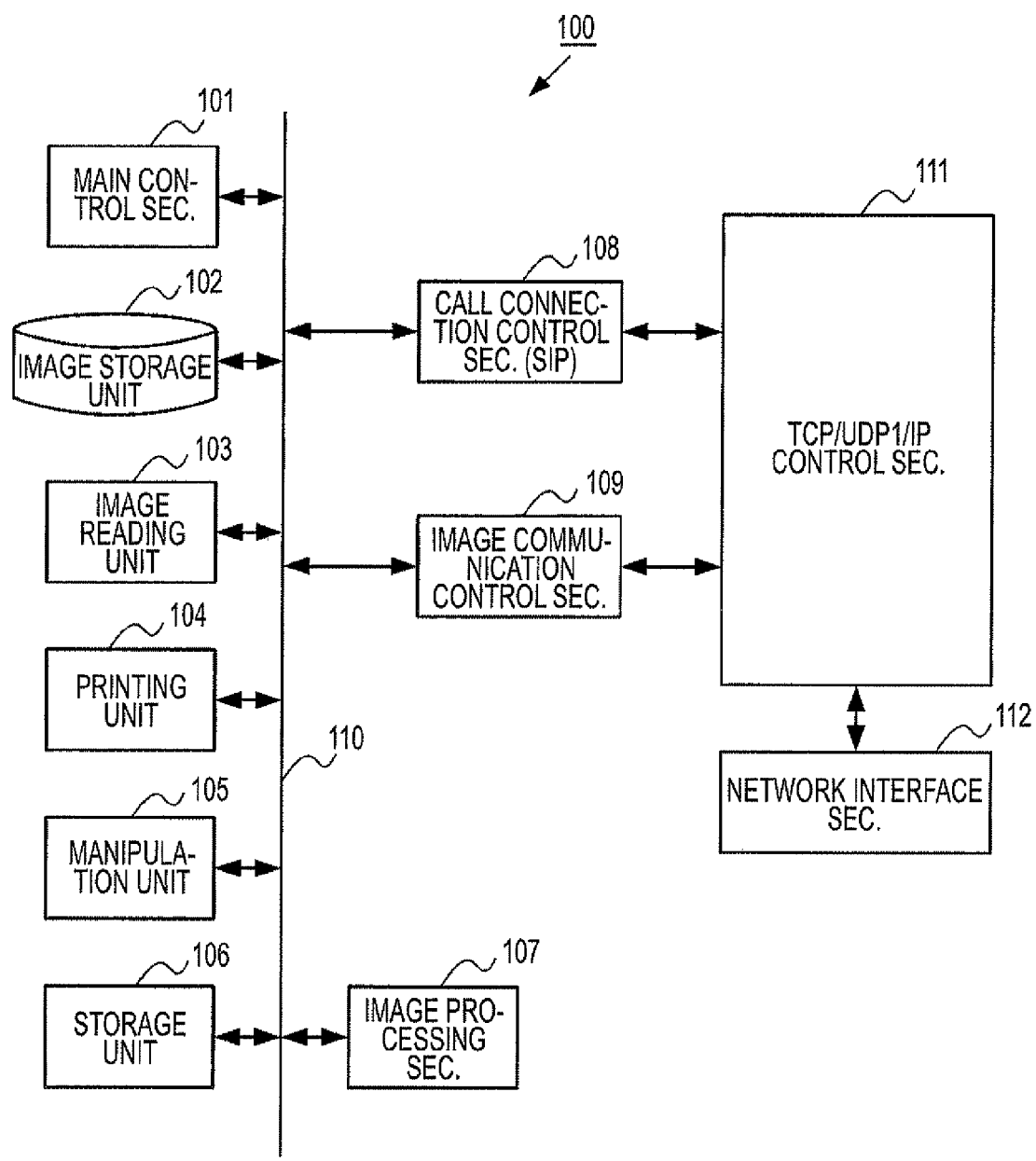
FIG. 1 is a block diagram showing a general configuration of an image communication apparatus according to the present invention.

FIG. 1 is a block diagram showing a general configuration of an image communication apparatus according to the invention. The image communication apparatus 100 is configured in such a manner that a main control section 101, an image storage unit 102, an image reading unit 103, a printing unit 104, a manipulation unit 105, a storage unit 106, an image processing section 107, a call connection control section 108, and an image communication control section 109 are connected to a bus 110 and the call connection control section 108 and the image communication control section 109 are connected to a network interface section 112 via a TCP/UDP/IP control section 111.

The control section 101 performs processing of controlling the entire image communication apparatus 100.

The image storage unit 102 stores images read by the image reading unit 103 or received over a network.

The image reading unit 103 reads an original image at a prescribed resolution, and the printing unit 104 prints an image at a prescribed resolution.

The manipulation unit 105 is equipped with various manipulation keys to be used for manipulating the image communication apparatus 100 and a display unit for displaying various kinds of information.

The storage unit 106, which is a RAM (random access memory), stores system data to be used for controlling the operations of the image communication apparatus 100, communication information, etc.

The image processing section 107 performs such processing as coding, decoding, enlargement, and reduction on image data.

The call connection control section 108 controls an SIP call connection. Example control functions provided by SIP are registration of position information, establishment and termination of a session, capability negotiation, and presence information exchange.

The image communication control section 109 controls an image communication according to a real-time communication protocol such as ITU (International Telecommunication Union)-T.38 or direct SMTP (simple mail transfer protocol).

The TCP/UDP/IP control section 111 performs a protocol control of the transport/network layer of the Internet. The network interface section 112, which is connected to an IP network, performs communication controls of the data link layer and the lower layers.

Figure 2:
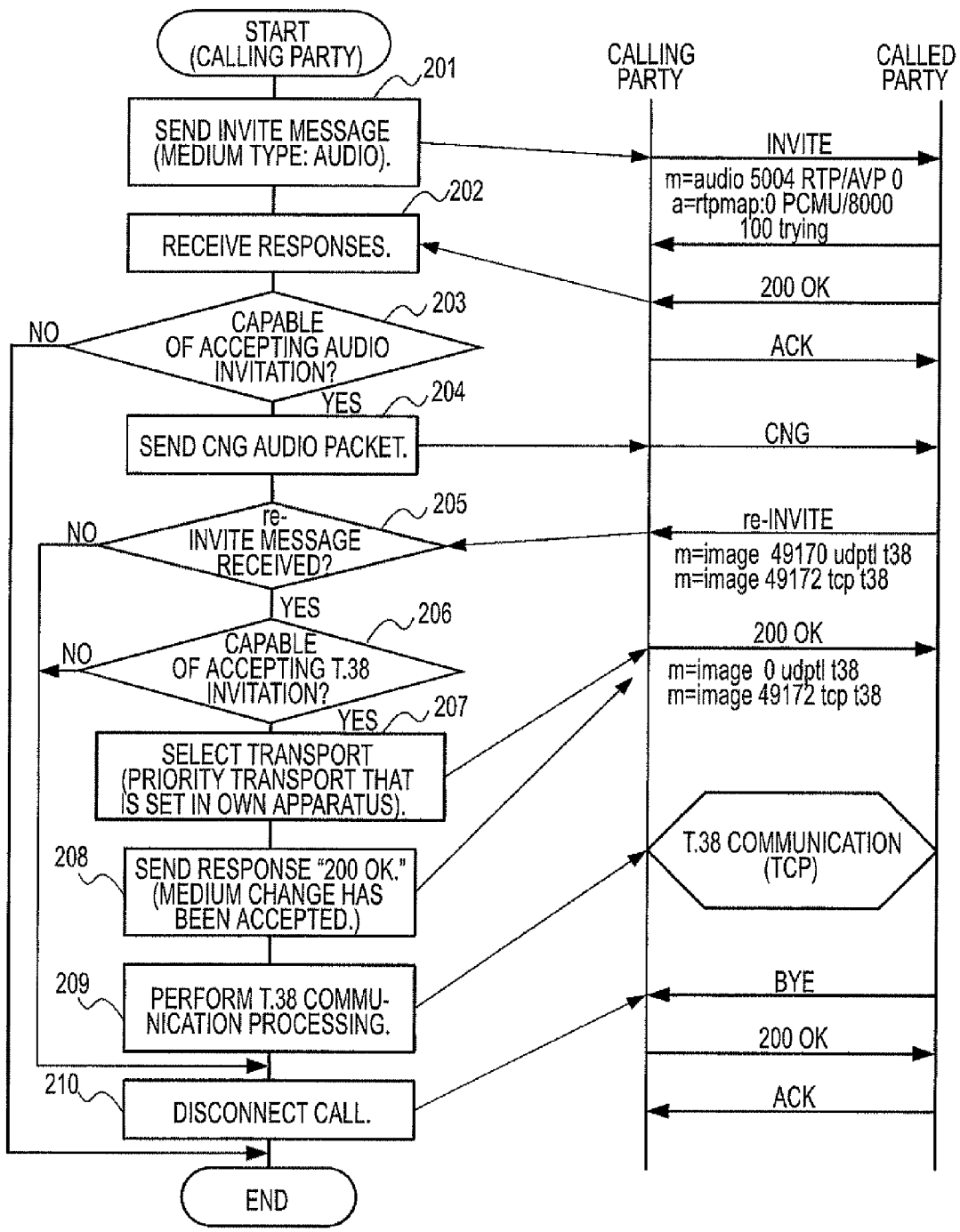
FIG. 2 is a flowchart and a sequence diagram of a process and a communication procedure which are executed and followed by the calling party, respectively, in a case that an INVITE SIP message in which a T.38 priority transport is specified is sent from the called party.

A process and a communication procedure which are executed and followed by the calling party (the image communication apparatus 100 of FIG. 1), respectively, in a case that an INVITE SIP message (re-INVITE) in which a T.38 priority transport is specified is sent from the called party will be described below with reference to FIG. 2.

The following description which will be made with reference to FIG. 2 will be directed to a case that the image communication apparatus 100 shown in FIG. 1 is a calling party apparatus.

First, the image communication apparatus 100 which is a calling party apparatus opens transmission parameters (image quality of an original, transmission image quality, etc.) of an image to be sent, specifies a transmission destination using an address book or the keyboard of the manipulation unit 105, and activate a communication.

In response, at step 201, the image communication apparatus 100 which is a calling party apparatus communicates an INVITE SIP message (hereinafter referred to as "initial INVITE message") which is a session start request to a called party apparatus. In the initial INVITE message, "audio" is specified as a medium type.

More specifically, in the initial INVITE message,
m=audio 5004 RTP/AVP 0
a=rtpmap:0 PCMU/8000 are written in an SDP. The information "m=audio 5004 RTP/AVP 0" indicates that the medium type is "audio," a port of number 5004 is used, and RTP (realtime transport protocol)/AVP (audio/video profile) is used as a protocol for an audio communication. The last character "0" means that a coding method called "μ-law" of PCM (pulse code modulation) was used.

Characters "rtpmap:" of "a=rtpmap:0PCMU/8000" are a prefix indicating attribute information of a PTP packet. Character "0" following "rtpmap:" means PCM μ-law coding as in the above case. Characters "PCMU/8000" means that an audio waveform was sampled at a rate of 8,000 times per second by the PCM μ-law coding.

The reason why "audio" is specified as a medium type in the initial INVITE message is that there exist SIP servers and VoIP gateways that refuse a connection if "image" is specified as a medium type. "Audio" is thus specified as a medium type in the INVITE message. In doing so, a payload number is caused to contain "G711"(PCM) which is a typical algorithm of VoIP codecs.

At step 202, in response to the initial INVITE message, "100 trying" indicating that the initial INVITE message has been received and "200 OK" indicating that the called party apparatus can deal with all media included in an SDP-described document are returned from the called party apparatus to the calling party.

If the called party apparatus cannot deal with all media included in an SDP-described document, that is, cannot accept the audio invitation (step 203: no), the calling party receives a 488 (not acceptable here) response and finishes the process.

If it is judged that the called party apparatus can accept the audio invitation (step 203: yes), at step 204 the calling party sends a CNG audio packet to the transmission destination to let the called party recognize that the intended communication is an image communication.

To perform an image communication, the called party sends, to the calling party, an INVITE SIP message (re-INVITE) in which
m=image 49170 udptl t38
m=image 49172 tcp t38
are written in an SDP.

The information "m=image 49170 udptl t38" indicates that the image type is "image," a port of number 49470 is used, and the protocol is UDP using the T.38 communication function. The information "m=image tcp t38" indicates that the image type is "image," a port of number 49172 is used, and the protocol is TCP using the T.38 communication function.

The information "m=image 49170 udptl t38" is the first SDP list item, which means that UDP is specified as a priority transport of the called party.

When receiving the re-INVITE message (step 205: yes), the calling party judges at step 206 whether it can accept the T.38 invitation. If the calling party can accept the T.38 invitation (step 206: yes), it selects a transport at step 207.

Since the apparatus concerned is a calling party apparatus, the calling party opens a priority transport if it is set in the apparatus. If no priority transport is set in the apparatus, the calling party opens the priority transport that is specified in the re-INVITE message.

More specifically, since in this example TCP is set as a priority transport in the apparatus, at step 207 the calling party opens TCP If no priority transport is set in the apparatus, the calling party opens the priority transport that was specified in the re-INVITE message on the called party, that is, UDP.

After opening the TCP as a transport, at step 208 the calling party sends, to the called party, a response "200 OK" indicating that TCP has been opened and the media change from audio to image has been accepted.

In the response "200 OK,"
m=image 0 udptl t38
m=image 49172 tcp t38
are written in an SDP. The port number is set to "0" in "m=image 0 udptl t38," which means that TCP rather than UDP has been opened.

If the medium is not opened within a prescribed time from the transmission of the CNG audio packet, that is, the re-INVITE message is not received (step 205: no), the session is terminated and the process is finished.

If incapable of dealing with all media included in an SDP-described document of the re-INVITE message (step 206: no), the calling party sends a "488" (not acceptable here) response to the called party, terminates the session, and finishes the process.

The above steps are executed by the call connection control section 108 of the image communication apparatus 100 shown in FIG. 1.

After sending the response "200 OK" at step 208 to the called party, at step 209 the calling party performs TCP image communication processing using the T.38 communication function.

The image communication processing using the T.38 communication function is performed by the image communication control section 109 of the image communication apparatus 100 shown in FIG. 1.

When receiving a "BYE" message (session termination request) from the called party, at step 210 the calling party performs session termination (call disconnection) processing. The call disconnection processing is such that the calling party sends a response "200 OK" to the called party in response to the "BYE" message which has been sent from the called party and receives an acknowledgment response "ACK" from the called party.

Figure 3:
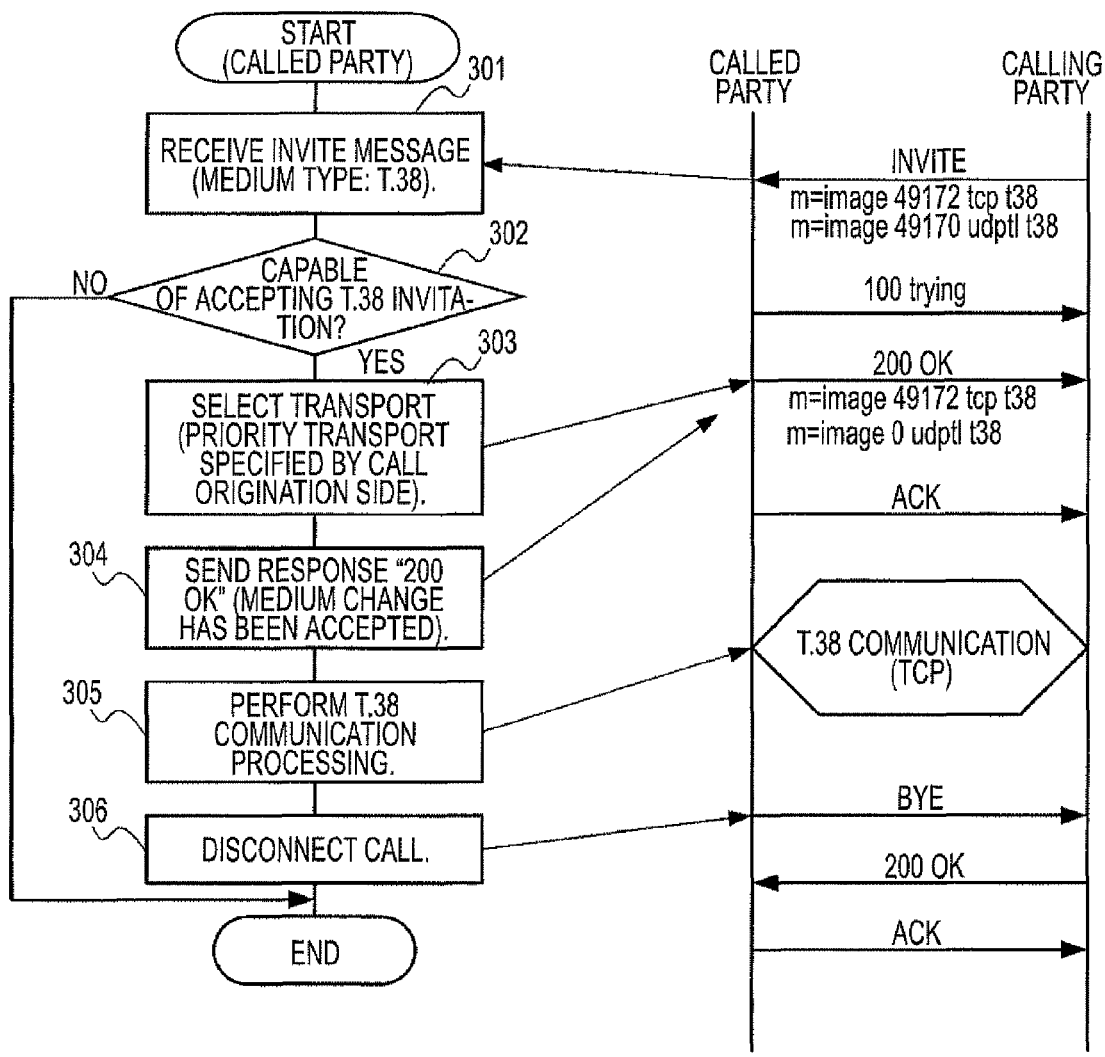
FIG. 3 is a flowchart and a sequence diagram of a process and a communication procedure which are executed and followed by the called party, respectively, in a case that it receives, from the calling party, an INVITE SIP message in which a T.38 priority transport is specified.

FIG. 3 is a flowchart and a sequence diagram of a process and a communication procedure which are executed and followed by the called party, respectively, in a case that it receives, from the calling party, an INVITE SIP message in which a T.38 priority transport is specified.

The following description which will be made with reference to FIG. 3 will be directed to a case that the image communication apparatus 100 shown in FIG. 1 is a called party apparatus.

When receiving, at step 301, from the calling party, an initial INVITE message in which
m=image 49172 tcp t38
m=image 49170 updtl t38
are written in an SDP and which indicates that the medium type is "image" and T.38 is used, the image communication apparatus 100 which is a called party apparatus checks at step 302 whether it can accept the T.38 invitation. If capable of accepting the T.38 invitation (step 302: yes), the called party selects a transport at step 303.

In this example, since the apparatus concerned is a called party apparatus, the apparatus opens TCP which is the priority transport specified in the initial INVITE message sent from the calling party and establishes a session with the calling party.

After opening TCP as a transport and establishing a session with the calling patty, at step 304 the called party sends, to the calling party, a response "200 OK" indicating that TCP has been opened and the media change from audio to image has been accepted.

In the response "200 OK,"
   m=image 49172 tcp t38
   m=image 0 udptl t38
are written in an SDP. The port number is set to "0" in "m=image 0 udptl t38," which means that TCP rather than UDP has been opened.

If incapable of dealing with all media included in an SDP-described document of the initial INVITE message (step 302: no), the called party sends a "488" (not acceptable here) response to the calling party, terminates the session, and finishes the process.

After sending the response "200 OK" to the calling party at step 304, at step 305 the called party performs TCP image communication processing using the T.38 communication function.

Call disconnection processing of step 306 is such that the called party sends a "BYE" message (session termination request) to the calling party and sends an acknowledgment response "ACK" to the calling party in response to a response "200 OK" which is sent from the calling party in response to the "BYE" message.

FIG. 4 is a flowchart and a sequence diagram of a process and a communication procedure which are executed and followed by the called party, respectively, in a case that a T.38 priority transport is specified by the calling party in establishing a session on the basis of an audio INVITE SIP message.

The following description which will be made with reference to FIG. 4 will be directed to a case that the image communication apparatus 100 shown in FIG. 1 is a called party apparatus.

At step 401, the image communication apparatus 100 which is a called party apparatus receives, from the calling party, an initial INVITE message in which
   m=audio 5004 RTP/AVP 0
   a=rtpmap:0 PCMU/8000
   i=priority tcp t38
are written in an SDP.

The pieces of information "m=audio 5004 RTP/AVP 0" and "a=rtpmap:0 PCMU/8000" are the same as described above with reference to FIG. 2. The information "i=priority tcp t38" indicates that the priority transport which uses the T.38 communication function is TCP.

The called party analyzes the SDP of the initial INVITE message and checks whether a priority transport which uses the T.38 communication function is specified therein. In this example, since TCP is specified as such a priority transport in the SDP, the called party acquires the priority transport information at step 402. At step 403, the called party sends responses "100 trying" and "200 OK" to the calling party and thereby establishes a session with the calling party.

If receiving an acknowledgment response "ACK" which is sent from the calling party in response to the above responses, the called party checks at step 404 whether it can accept the audio invitation. If the called party receives a "488" (not acceptable here) response from the calling party and cannot accept the audio invitation (step 404: no), the called party finishes the process.

If capable of accepting the audio invitation (step 404: yes), the called party checks at step 405 whether T.38 priority transport information is contained in the SDP. In this example, since the priority transport information was acquired at step 402 (step 405: yes), the called party employs the priority transport of the acquired information at step 407 and sends a re-INVITE message in which the medium type is "T.38" to the calling party at step 408.

If it is judged at step 405 that T.38 priority transport information is not contained in the SDP (step 405: no), the called party employs a priority transport that is set in system data of its own apparatus at step 406 and sends a re-INVITE message in which the medium type is "T.38" to the calling party at step 408.

In this example, since the priority transport information to the effect that the priority transport is TCP was acquired at step 402,
   m=image 49172 tcp t38
   m=image 49170 udptl t38
are written in the SDP of the re-INVITE message.

When receiving the above re-INVITE message, the calling party opens TCP as a priority transport and returns, to the called party, a response "200 OK" in which
   m=image 49172 tcp t38
   m=image 0 udptl t38
are written in an SDP.

When receiving the response "200 OK," the called party accepts the medium change from audio to image at step 409 and performs image communication processing using the T.38 communication function at step 410.

Call disconnection processing of step 411 is such that the called party sends a "BYE" message (cession termination request) to the calling party and sends an acknowledgment response "ACK" to the calling party in response to a response "200 OK" which is sent from the calling party in response to the "BYE" message.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image communication apparatus comprising:
   a call connection control unit of a calling party that establishes a session with a called party using an SIP message; and
   an image communication control unit that controls an image communication which complies with the ITU-T Recommendation T.38, wherein
   if
      (i) after the call connection control unit establishes the session with the called party, the call connection control unit receives from the called party, an INVITE SIP message in which a T.38 communication and a plurality of priority transports each corresponding to one of a plurality of transport layer protocols and each having a distinct priority is specified in a session description protocol, and
      (ii) one or more of the priority transports is set in the image communication apparatus of the calling party,
   then the call connection control unit opens the highest priority transport set in the image communication apparatus of the calling party that is also specified in the session description protocol and performs a T.38 communication using the opened transport, and
   if no priority transport is set in the image communication apparatus of the calling party, then the call connection control unit opens the highest priority transport specified by the called party, and performs a T.38 communication using the opened transport.

2. The image communication apparatus according to claim 1, wherein the priority transports are each either a TCP transport or a UDP transport.

3. The image communication apparatus according to claim 1, wherein when the call connection control unit opens any priority transport, the call connection control unit returns a response SIP message to the called party that the priority transport has been opened.

* * * * *